United States Patent
Kawakami

(10) Patent No.: US 8,432,115 B2
(45) Date of Patent: Apr. 30, 2013

(54) MOTOR DRIVE CIRCUIT

(75) Inventor: Hiroaki Kawakami, Gunma (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 95 days.

(21) Appl. No.: 13/234,929

(22) Filed: Sep. 16, 2011

(65) Prior Publication Data

US 2012/0068647 A1   Mar. 22, 2012

(30) Foreign Application Priority Data

Sep. 16, 2010  (JP) .................................. 2010-208160

(51) Int. Cl.
*H02P 6/00* (2006.01)
(52) U.S. Cl.
USPC ................................................... 318/400.29
(58) Field of Classification Search .................. None
See application file for complete search history.

(56) References Cited

U.S. PATENT DOCUMENTS

| 7,755,312 B2* | 7/2010 | Hirata ....................... 318/400.29 |
| 2008/0185987 A1* | 8/2008 | Kawakami et al. ........... 318/811 |
| 2011/0057600 A1* | 3/2011 | Suda ............................. 318/696 |

FOREIGN PATENT DOCUMENTS

JP       2008-141831 A     6/2008

* cited by examiner

*Primary Examiner* — Walter Benson
*Assistant Examiner* — Zoheb Imtiaz
(74) *Attorney, Agent, or Firm* — Osha Liang LLP

(57) ABSTRACT

A motor-drive circuit includes: H-bridge circuits in a pair each including first-source and first-sink transistors, and second-source and second-sink transistors, wherein a motor coil connected between a connection point of the first-source and first-sink transistors and a connection point of the second-source and second-sink transistors; a current-detection circuit to detect a current flowing through the motor coil of each of the H-bridge circuits; an oscillation circuit; and a control circuit to control the H-bridge circuits so as to turn on the first-source and second-sink transistors of each of the H-bridge circuits at intervals of a predetermined period based on an oscillation signal, and turn off the second-sink transistor of each of the H-bridge circuits after a value of a current flowing through the motor coil of each of the circuits reaches a predetermined value, based on a detection result of the current-detection circuit.

6 Claims, 6 Drawing Sheets

MOTOR DRIVE CIRCUIT

CROSS-REFERENCE TO RELATED APPLICATION

This application claims the benefit of priority to Japanese Patent Application No. 2010-208160, filed Sep. 16, 2010, of which full contents are incorporated herein by reference.

BACKGROUND OF THE INVENTION

1. Field of the Invention

The present invention relates to a motor drive circuit.

2. Description of the Related Art

A motor drive circuit is known that is configured to control ON/OFF of a transistor connected to a motor coil so that a current flowing through the motor coil is kept constant (see, e.g., Japanese Laid-Open Patent Publication No. 2008-141831).

FIG. 7 is a diagram illustrating an example of a motor drive circuit 200 configured to drive a motor coil L with a constant current. A control circuit 300 controls ON/OFF of PMOS transistors 310 and 311 and NMOS transistors 312 and 313 based on an oscillation signal Vosc with a predetermined period and a voltage Vr corresponding to a current IL. For example, as indicated at time t0 of FIG. 8, when the oscillation signal Vosc goes high (high level), the control circuit 300 turns on the PMOS transistor 310 and the NMOS transistor 313. In this case, since the control circuit 300 turns off the PMOS transistor 311 and the NMOS transistor 312, the current IL increases while flowing through a path A1.

When the current value of the current IL reaches a predetermined value at time t1, the control circuit 300 controls an H-bridge circuit 301 so as to reduce the current IL, and thereafter results in turning off all the transistors of the H-bridge circuit 301.

As a result, the current IL decreases while flowing through a path A2 via diodes 320 and 321. At time t2, the control circuit 300 turns on again the PMOS transistor 310 and the NMOS transistor 313. Since such an operation is repeated, the motor coil L is driven with a constant current.

When the NMOS transistor 313 is turned on at time t0 and time t2, a reverse recovery current from the diode 321 flows to the NMOS transistor 313. Therefore, in general, radiation noise caused by the reverse recovery current is generated with the timing when the NMOS transistor 313 is turned on. The period of radiation noise generation, which is caused by the reverse recovery current, is identical to the period of the oscillation signal Vosc, i.e., the chopping period of the motor drive circuit 200. Therefore, for example, when a plurality of motor coils are driven with a constant current, if the chopping period varies with the motor coils, the radiation noises are generated with various periods. In such a case, the influence of the radiation noises increases, which leads a user to the needs for taking measures for every radiation noises generated with various periods.

SUMMARY OF THE INVENTION

A motor drive circuit according to an aspect of the present invention, which is configured to supply a current to a motor, includes: H-bridge circuits in a pair each including a first source transistor and a first sink transistor connected in series, a second source transistor and a second sink transistor connected in series, and first to fourth regenerative diodes respectively provided in the first and second source transistors and the first and second sink transistors, the motor coil connected between a connection point of the first source and first sink transistors and a connection point of the second source and second sink transistors; a current detection circuit configured to detect a current flowing through the motor coil of each of the H-bridge circuits in a pair; an oscillation circuit configured to output an oscillation signal with a predetermined period; and a control circuit configured to control the H-bridge circuits in a pair so as to turn on the first source transistor and the second sink transistor of each of the H-bridge circuits in a pair, at intervals of the predetermined period based on the oscillation signal, and turn off the second sink transistor of one of the H-bridge circuits after a current value of a current flowing through the motor coil of the one of the H-bridge circuits reaches a predetermined value and turn off the second sink transistor of the other of the H-bridge circuits after a current value of a current flowing through the motor coil of the other of the H-bridge circuits reaches a predetermined value, based on a detection result of the current detection circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 3 is a diagram for explaining operation of an oscillation circuit 21a;

DETAILED DESCRIPTION OF THE INVENTION

At least the following details will become apparent from descriptions of this specification and of the accompanying drawings.

Figure 1:
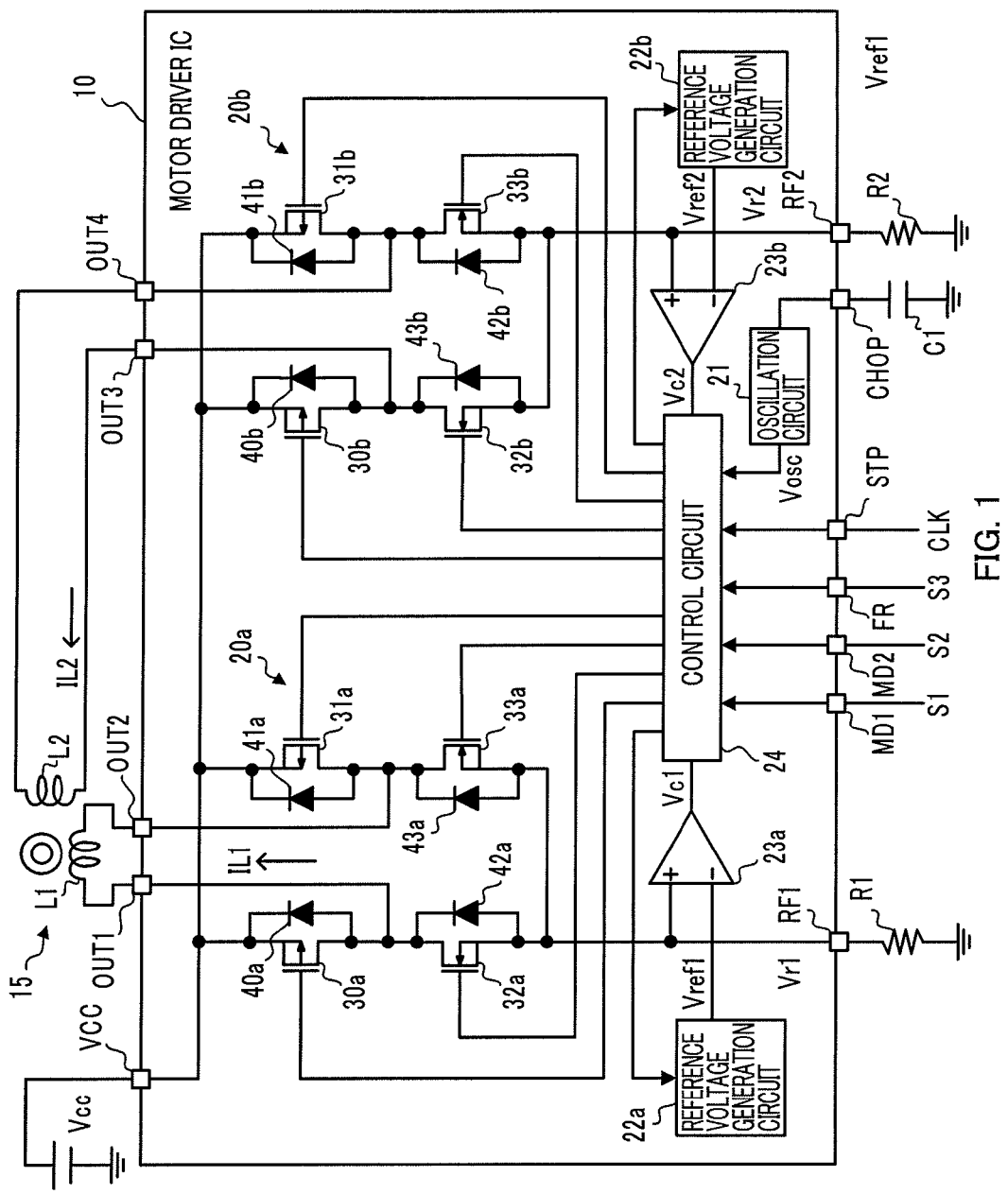
FIG. 1 is a diagram illustrating a configuration of a motor driver IC 10 according to one embodiment of the present invention.

FIG. 1 depicts a configuration of a motor driver IC (Integrated Circuit) 10 according to one embodiment of the present invention.

The motor driver IC 10 (motor drive circuit) is a circuit configured to drive a stepping motor 15 in accordance with instructions from a microcomputer (not depicted). The motor driver IC 10 includes H-bridge circuits 20a, 20b, an oscillation circuit 21, reference voltage generation circuits 22a, 22b, comparators 23a, 23b, and a control circuit 24. The motor driver IC 10 includes terminals VCC, OUT1 to OUT4, RF1, RF2, CHOP, MD1, MD2, FR, and STP as connection terminals connected to the outside.

The stepping motor 15 is used for controlling a position of a printer head, for example, and includes motor coils L1 and L2.

The H-bridge circuit 20a includes PMOS transistors 30a, 31a, NMOS transistors 32a, 33a, and diodes 40a to 43a.

The connection point between the PMOS transistor 30a (first source transistor) and the NMOS transistor 32a (first sink transistor) is connected to the terminal OUT1, and the connection point of the PMOS transistor 31a (second source transistor) and the NMOS transistor 33a (second sink transistor) is connected to the terminal OUT2. The motor coil L1 is connected between the terminal OUT1 and the terminal OUT2. The diodes 40a to 43a (regenerative diodes) are body diodes (parasitic diodes) of the PMOS transistors 30a and 31a and the NMOS transistors 32a and 33a, respectively.

The H-bridge circuit 20b includes PMOS transistors 30b, 31b, NMOS transistors 32b, 33b, and diodes 40b to 43b. The H-bridge circuit 20b is similar to the H-bridge circuit 20a, and will not be described in detail. The H-bridge circuit 20a and the H-bridge circuit 20b correspond to H-bridge circuits in a pair.

The oscillation circuit 21 is configured to output an oscillation signal Vosc with a period corresponding to a value of an element (capacitor or resistor) that is connected to the terminal CHOP. The oscillation signal Vosc is used when the H-bridge circuits 20a and 20b perform the chopping control for the motor coil L1 and L2. In FIG. 1, a capacitor C1 is connected to the terminal CHOP.

Figure 2:
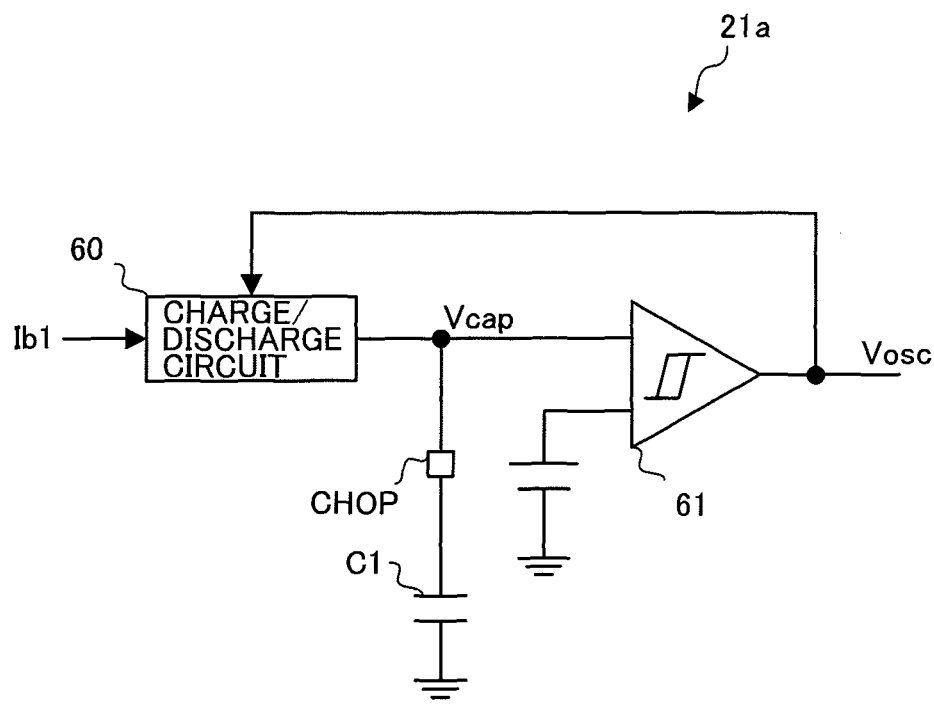
FIG. 2 is a diagram illustrating a first embodiment of an oscillation circuit 21.

FIG. 2 depicts a first embodiment of the oscillation circuit 21 (oscillation circuit 21a). The oscillation circuit 21a includes a charge/discharge circuit 60 and a hysteresis comparator 61.

If the oscillation signal Vosc which is an output from the hysteresis comparator 61 is low (low level), the charge/discharge circuit 60 charges the capacitor C1 with a constant bias current Ib1. In contrast, if the oscillation signal Vosc is high (high level), the charge/discharge circuit 60 discharges the capacitor C1 with the bias current Ib1.

Figure 3:
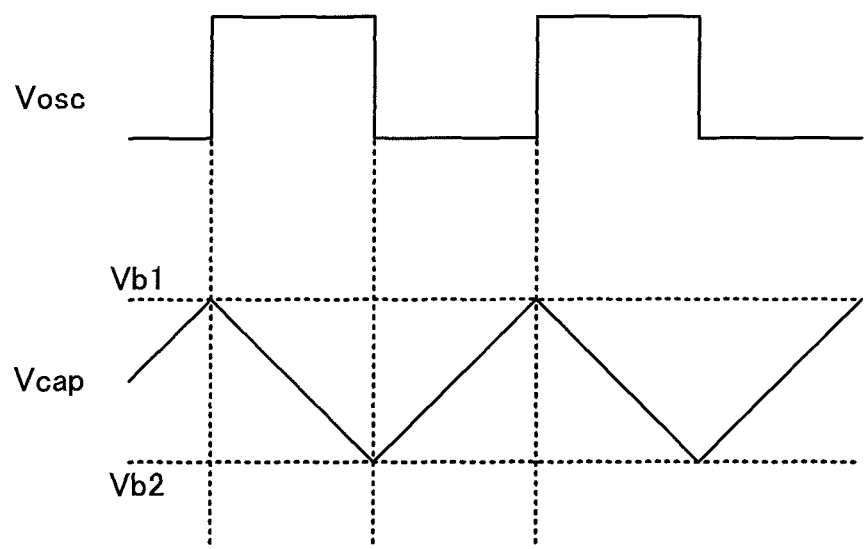

If a charging voltage Vcap of the capacitor C1 rises to reach a predetermined voltage Vb1, the hysteresis comparator 61 outputs the high level oscillation signal Vosc. In Contrast, if the charging voltage Vcap drops to reach a predetermined voltage Vb2 (<Vb1), the hysteresis comparator 61 outputs the low level oscillation signal Vosc. Therefore, the oscillation circuit 21a outputs the oscillation signal Vosc as depicted in FIG. 3, for example. The time in which the charging voltage Vcap changes between the voltages Vb1 and Vb2, that is, the time in which the charging voltage Vcap drops from the voltage Vb1 to Vb2 or the time in which the charging voltage Vcap rises from the voltage Vb2 to Vb1, becomes longer if the capacitance value of the capacitor C1 becomes greater. Therefore, the period of the oscillation signal Vosc varies with the capacitance value of the capacitor C1 connected to the terminal CHOP.

Figure 4:
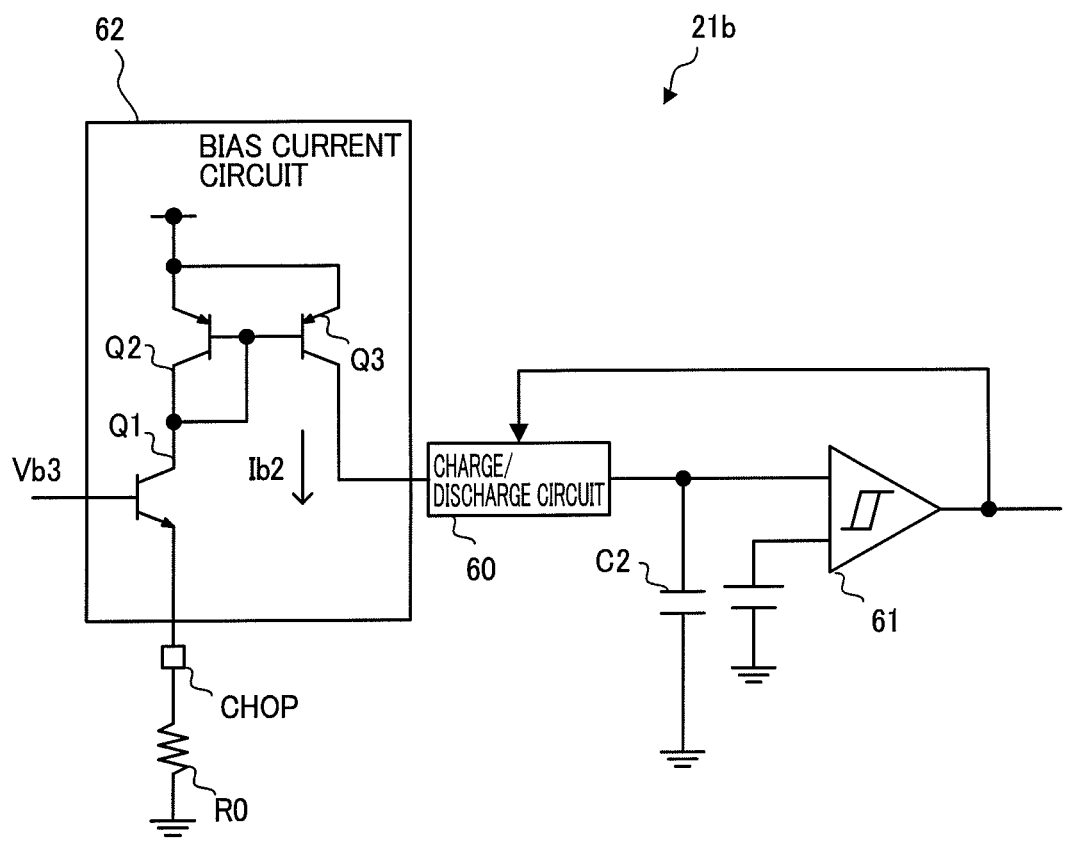
FIG. 4 is a diagram illustrating a second embodiment of an oscillation circuit 21.

FIG. 4 depicts a second embodiment of the oscillation circuit 21 (oscillation circuit 21b). The oscillation circuit 21b includes the charge/discharge circuit 60, the hysteresis comparator 61, a bias current circuit 62, and a capacitor C2. In FIG. 4, the blocks denoted by the same reference numerals in FIG. 2 are the same blocks as those in FIG. 2. The capacitor C2 has a predetermined capacitance value.

The bias current circuit 62 is a circuit configured to supply the charge/discharge circuit 60 with a bias current Ib2 corresponding to a resistance value of a resistor R0 connected to the terminal CHOP. The bias current circuit 62 includes an NPN transistor Q1 and PNP transistors Q2 and Q3.

The resistor R0 is connected to an emitter of the NPN transistor Q1 via the terminal CHOP, and a predetermined voltage Vb3 is applied to a base of the NPN transistor Q1. Thus, a current corresponding to the resistance value of the resistor R0 flows through the NPN transistor Q1. The diode-connected PNP transistors Q2 and Q3 make up a current mirror. As a result, the PNP transistor Q3 outputs the bias current Ib2 corresponding to the resistance value of the resistor R0.

Therefore, since the capacitor C2 is charged or discharge with the bias current Ib2 corresponding to the resistance value of the resistor R0, the oscillation circuit 21b outputs the oscillation signal Vosc with the period corresponding to the resistance value of the resistor R0.

The reference voltage generation circuit 22a is configured to output a reference voltage Vref1 to determine a current value of a current IL1 flowing to the motor coil L1. In an embodiment of the present invention, for example, when the reference voltage Vref1 rises, the current value of the current IL1 increases. The reference voltage generation circuit 22a is configured to change the reference voltage Vref1 based on an instruction from the control circuit 24.

The comparator 23a is configured to determine whether the current value of the current IL1 is greater than a set current value I1 corresponding to the reference voltage Vref1. Since the current IL1 flows to a resistor R1 via the terminal RF1, a voltage Vr1 corresponding to the current value of the current IL1 is generated in the resistor R1. Therefore, if the voltage Vr1 is lower than the reference voltage Vref1, the comparator 23a outputs a low level signal Vc1 indicating that the current value of the current IL1 is smaller than the set current value I1. In contrast, if the voltage Vr1 is higher than the reference voltage Vref1, the comparator 23a outputs a high level signal Vc1 indicating that the current value of the current IL1 is greater than the set current value I1.

The reference voltage generation circuit 22b is configured to output a reference voltage Vref2 to determine a current value of a current IL2 flowing to the motor coil L2 similarly to the reference voltage generation circuit 22a.

The comparator 23b is configured to determine whether the current value of the current IL2 is greater than a set current value I2 corresponding to the reference voltage Vref2 similarly to the comparator 23a. Since the current IL2 flows to a resistor R2 connected via the terminal RF2, a voltage Vr2 corresponding to the current IL2 is generated in the resistor R2. The comparators 23a and 23b correspond to a current detection circuit.

The control circuit 24 is a logic circuit configured to control the H-bridge circuits 20a and 20b such that the stepping motor 15 rotates to a desired step position based on various signals input from a microcomputer (not depicted), the oscillation signal Vosc, and the signals Vc1 and Vc2.

The signals input to the control circuit 24 include signals S1 and S2 indicative of an excitation mode, a signal S3 indicative of the forward/backward rotation of the stepping motor 15, and a clock signal CLK to provide an instruction for a step. The signals S1 to S3 and the clock signal CLK are respectively input via the terminals MD1, MD2, FR, and STP. The control circuit 24 is configured to control the reference voltage generation circuits 22a and 22b according to the clock signal CLK to cause the reference voltage generation circuits 22a and 22b to output the reference voltages Vref1 and Vref2 determined by an excitation mode. The control circuit 24 is configured to control the switching of the transistors of the H-bridge circuits 20a and 20b so that the current values of the currents IL1 an IL2 reach the set current values I1 and I2 corresponding to the reference voltages Vref1 and Vref2.

Figure 5:
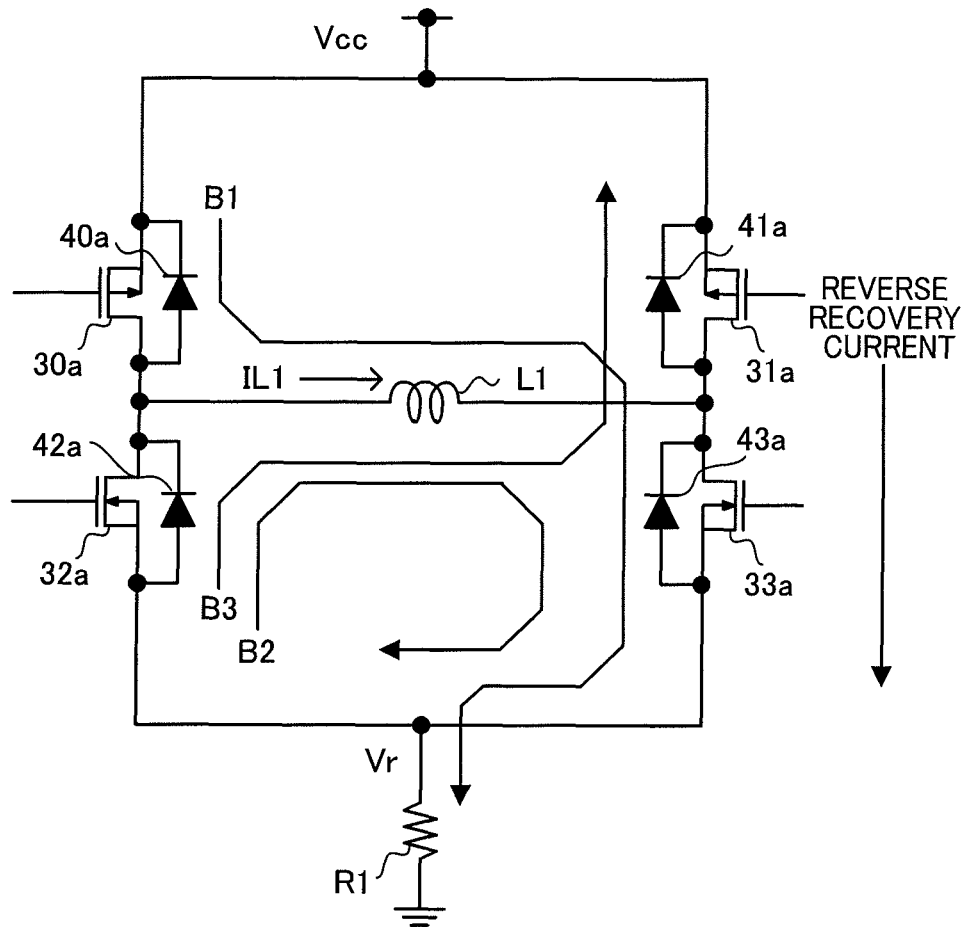
FIG. 5 is a diagram describing a path of a current IL1.

Specifically, for example, in a case where the stepping motor 15 is rotated in a normal direction, when the oscillation signal Vosc goes high, the control circuit 24 turns on the PMOS transistor 30a and the NMOS transistor 33a of the H-bridge circuit 20a as depicted in FIG. 5. In this case, the PMOS transistor 31a and the NMOS transistor 32a are off, the current IL1 increases while flowing through a path B1 (charge mode).

If the signal Vc1 goes high, the control circuit 24 turns off the PMOS transistor 30a and turns on the NMOS transistor 32a. As a result, the current IL1 moderately decreases while flowing through a path B2 (low-speed attenuation mode).

In order to decrease the current IL1 more rapidly, the control circuit 24 turns off the NMOS transistor 33a, thereafter turns on the PMOS transistor 31a for only a short time, and turns off the PMOS transistor 31a and the NMOS transistor 32a (high-speed attenuation mode). The rapid reduction in the current IL1 by the control circuit 24 enables the current IL1 to immediately reach the set current value I1, even when the set current value I1 is rapidly reduced, for example. The period during which the PMOS transistor 31a and the NMOS transistor 32a are on by the control circuit 24 is a period sufficiently shorter than the period of the oscillation signal Vosc. When the PMOS transistor 31a and the NMOS transistor 32a are turned off, the current IL1 flows through a path B3 via the diode 42a, the motor coil L1, and the diode 41a.

If the oscillation signal Vosc goes high after all the transistors in the H-bridge circuit 20a are turned off, the control circuit 24 sets the operation mode of the H-bridge circuit 20a to the charge mode. When the operation mode is set to the charge mode and the NMOS transistor 33a is turned on, a reverse recovery current from the diode 41a flows through the NMOS transistor 33a. This reverse recovery current is generated, when the NMOS transistor 33a is turned on from a state where the NMOS transistor 33a is off and a current is flowing through the diode 41a.

If the stepping motor 15 is rotated in an opposite direction, for example, the control circuit 24 performs switching for the transistors of the H-bridge circuit 20a so that the current flows in the opposite direction to that of the current IL1 depicted in FIG. 5. The control circuit 24 is configured to control the H-bridge circuit 20b similarly to the H-bridge circuit 20a.

==Operation of the Motor Driver IC 10==

Figure 6:
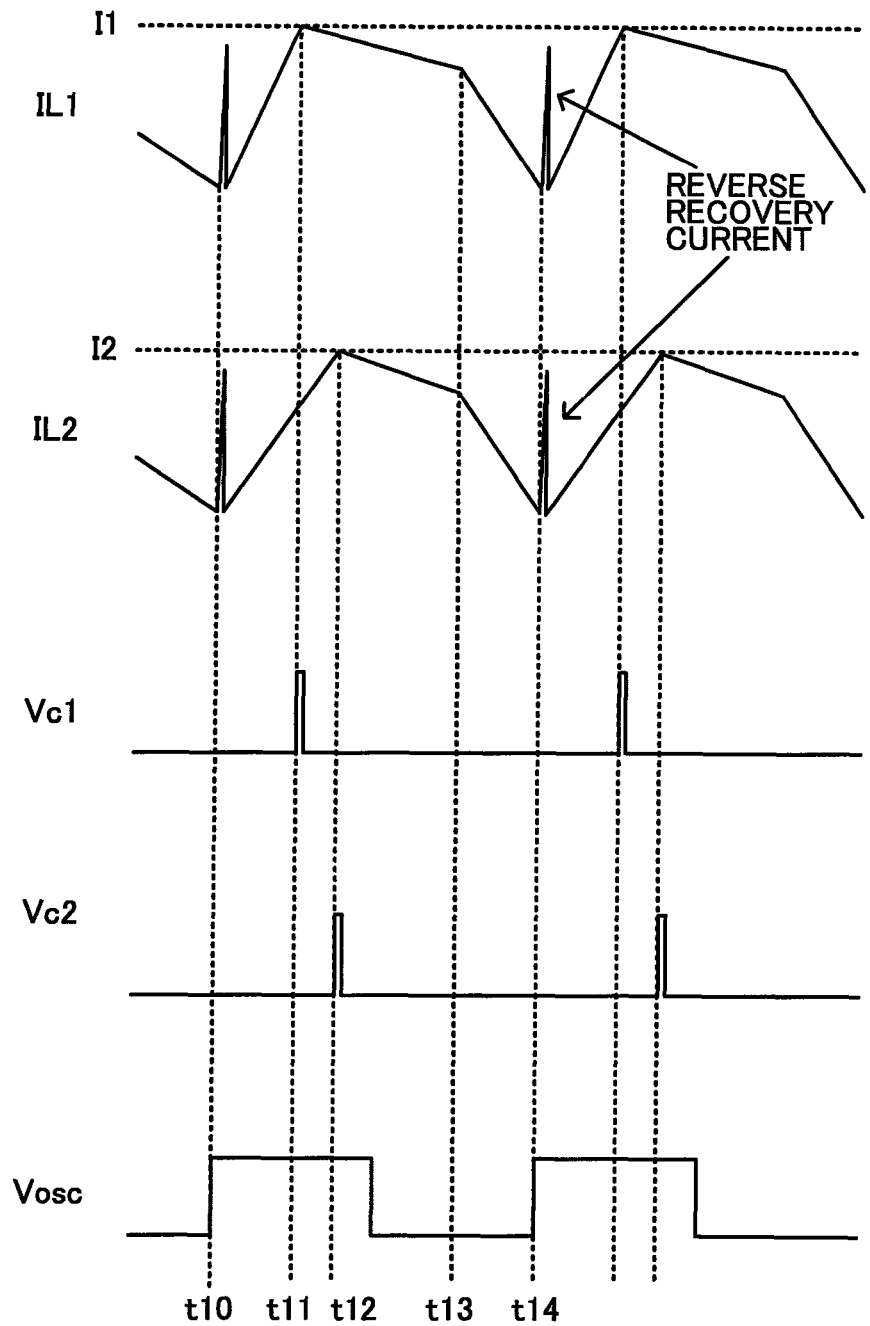
FIG. 6 is a diagram describing an operation of a motor driver IC 10.
Figure 7:
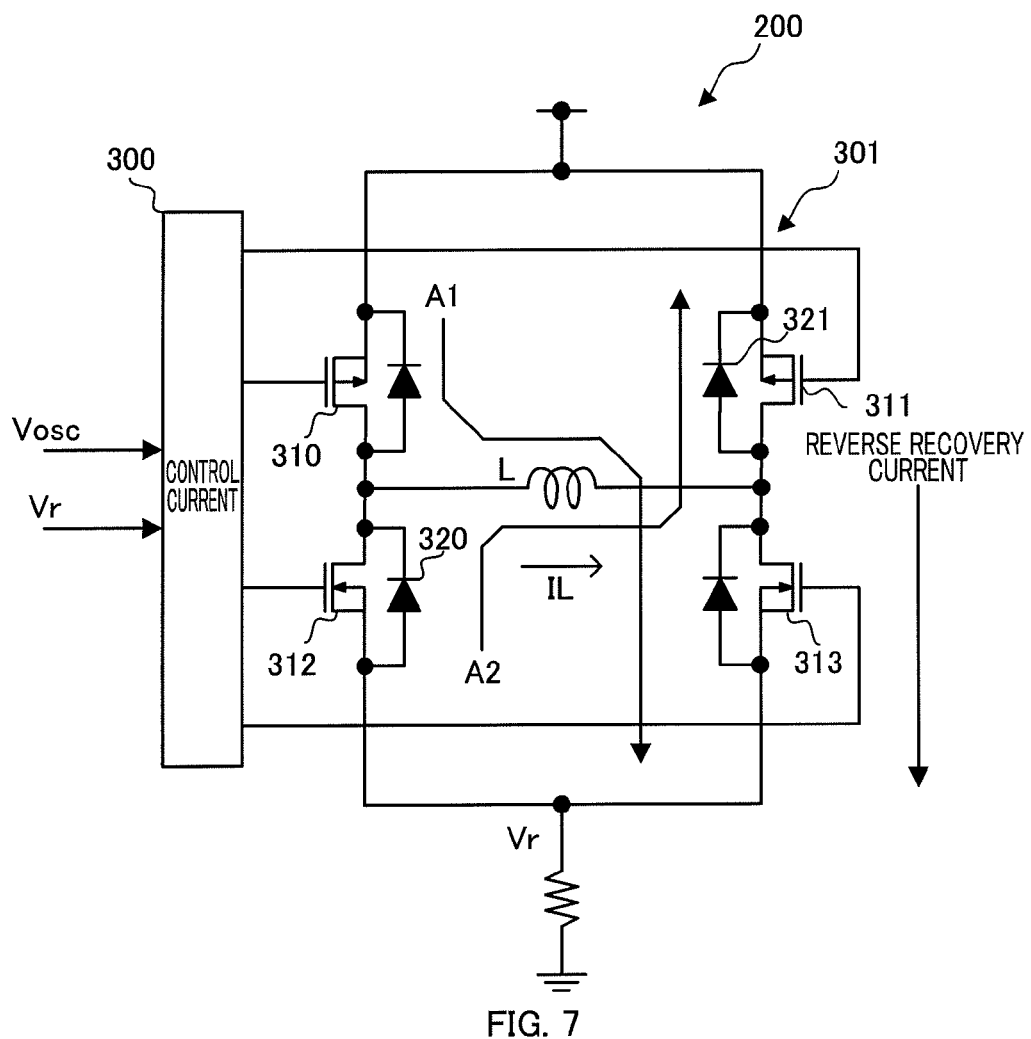
FIG. 7 is a diagram of a configuration of a common motor drive circuit 200.
Figure 8:
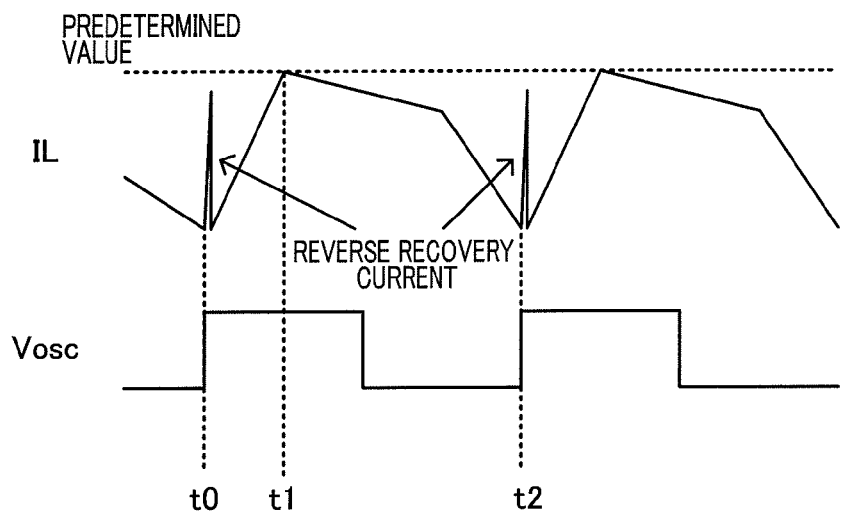
FIG. 8 is a diagram describing an operation of a motor drive circuit 200.

FIG. 6 is a timing chart illustrating an example of the operation of the motor driver IC 10. It is assumed that the stepping motor 15 is rotated forwarding the normal direction, for example. It is also assumed that the set current values I1 and I2 are constant in a time period depicted in FIG. 6.

When the oscillation signal Vosc goes high at time t10, the control circuit 24 sets the operation modes of the H-bridge circuits 20a and 20b into the charge mode. Therefore, the currents IL1 and the IL2 increase. When the current value of the current IL1 reaches the set current value I1 and the signal Vc1 goes high at time t11, the current circuit 24 sets the operation mode of the H-bridge circuit 20a to the low-speed attenuation mode. As a result, the current IL1 moderately decreases.

When the current value of the current IL2 reaches the set current value I2 and the signal Vc2 goes high at time t12, the control circuit 24 sets the operation mode of the H-bridge circuit 20b to the low-speed attenuation mode. As a result, the current IL2 decreases in a moderate manner.

At time t13, the control circuit 24 sets the operation modes of the H-bridge circuits 20a and 20b to the high-speed attenuation mode, and therefore, the currents IL1 and IL2 rapidly decrease. At time t14 after one period of the oscillation signal Vosc from time t10, the control circuit 24 changes the operation modes of the H-bridge circuits 20a and 20b again into the charge mode. At time t14 when the charge mode is started, the reverse recovery current flows through each of the H-bridge circuits 20a and 20b.

The motor driver IC 10 according to an embodiment of the present invention has been described above. As depicted in FIG. 6, the reverse recovery current generated in each of the H-bridge circuits 20a and 20b is generated every period of the oscillation signal Vosc. Thus, the period of radiation noise caused by the reverse recovery current is identical to the period of the oscillation signal Vosc. Therefore, the influence of the radiation noise is suppressed as compared to the case where the periods of the reverse recovery currents, which are generated in the H-bridge circuits 20a and 20b, are different from each other, for example.

The reverse recovery current generated in each of the H-bridge circuits 20a and 20b is generated with the timing when the oscillation signal Vosc goes high (to one logic level). That is, the timing when a plurality of radiation noises are generated is synchronized with the timing when the oscillation signal Vosc goes high. Therefore, a user can accurately grasp the timing of generation of the radiation noises.

The period of the oscillation signal Vosc varies with the capacitance value of the capacitor C1 connected to the terminal CHOP. Therefore, a user can adjust the radiation noise generation period to a desired period, for example, a period not affecting other electronic components.

Since the period of the oscillation signal Vosc can be varied with the resistance value of the resistor R0 which is connected to the terminal CHOP, the same effect can be acquired as that in the case where the capacitance value of the capacitor C1 is changed.

The H-bridge circuits 20a and 20b are configured with MOS transistors not bipolar transistors. The body diodes of MOS transistors are used as the diodes for regenerating the currents IL1 and IL2. Therefore, it is not necessary to separately provide a regenerative diode in an embodiment of the present invention.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit configured to supply a current to a motor comprising:
    H-bridge circuits in a pair each including a first source transistor and a first sink transistor connected in series, a second source transistor and a second sink transistor connected in series, and first to fourth regenerative diodes respectively provided in the first and second source transistors and the first and second sink transistors, the motor coil connected between a connection point of the first source and first sink transistors and a connection point of the second source and second sink transistors;
    a current detection circuit configured to detect a current flowing through the motor coil of each of the H-bridge circuits in a pair;
    an oscillation circuit configured to output an oscillation signal with a predetermined period; and
    a control circuit configured to control the H-bridge circuits in a pair so as to
        turn on the first source transistor and the second sink transistor of each of the H-bridge circuits in a pair, at intervals of the predetermined period based on the oscillation signal, and
        turn off the second sink transistor of one of the H-bridge circuits after a current value of a current flowing through the motor coil of the one of the H-bridge circuits reaches a predetermined value and turn off the second sink transistor of the other of the H-bridge circuits after a current value of a current flowing through the motor coil of the other of the H-bridge circuits reaches a predetermined value, based on a detection result of the current detection circuit.

2. The motor drive circuit of claim 1,
wherein the oscillation circuit is configured to output the oscillation signal that reaches one logical level at intervals of the predetermined period, and
the control circuit is configured to control the H-bridge circuits in a pair so as to turn on the first source transistor and the second sink transistor of each of the H-bridge circuits in a pair if the oscillation signal reaches the one logical level.

3. The motor drive circuit of claim 2,
wherein the motor drive circuit is an integrated circuit,
the motor drive circuit further includes a terminal to be connected to a capacitor, and
the oscillation circuit is configured to output the oscillation signal with a period corresponding to a value of the capacitor.

4. The motor drive circuit of claim 2,
wherein the motor drive circuit is an integrated circuit,
the motor drive circuit further includes a terminal connected to a resistor, and
the oscillation circuit is configured to output the oscillation signal with a period corresponding to a value of the resistor.

5. The motor drive circuit of claim 3,
wherein the first and second source transistors and the first and second sink transistors are first to fourth MOS transistors, respectively, and
the first to fourth regenerative diodes are parasitic diodes of the first to fourth MOS transistors, respectively.

6. The motor drive circuit of claim 4,
wherein the first and second source transistors and the first and second sink transistors are first to fourth MOS transistors, respectively, and
the first to fourth regenerative diodes are parasitic diodes of the first to fourth MOS transistors, respectively.

* * * * *